Dec. 1, 1931.  C. R. SHORT  1,834,746

BEARING

Filed Sept. 22, 1927

Inventor
Charles R. Short
By Spencer Hardman & Fehr
his Attorneys

Patented Dec. 1, 1931

1,834,746

UNITED STATES PATENT OFFICE

CHARLES R. SHORT, OF DETROIT, MICHIGAN. ASSIGNOR TO THE MORAINE PRODUCTS COMPANY, OF DAYTON, OHIO, A CORPORATION OF OHIO

BEARING

Application filed September 22, 1927. Serial No. 221,341.

It has been found desirable to employ porous metallic substances which may absorb oil for surfaces of bearings or other metallic elements having a rolling or sliding contact.

This invention relates to such elements and a method of manufacturing them.

It is the principal object of this invention to provide an improved element of this character in which a body comprising a porous metallic substance and having novel structural form is joined to a denser metallic body by means of a metallic bond to securely attach the two bodies together.

It is a further object of the invention to devise an improved method of making elements of the character described which includes a novel process of bonding the porous and denser metallic bodies together so that the porous body will be securely attached to the denser metallic body over the entire area of their juxtaposed surfaces.

With these objects in view, one feature of the invention consists in the formation of the porous metallic body into layers having different degrees of porosity, and in bonding the less porous layer of said porous metallic body to the denser metal. The porosity of the less porous layer may be zero.

It is also a feature of this invention to provide a bonding material consisting of a mixture of metals having different melting points.

It has been found that an unsatisfactory bond is formed if the porous metallic body is heated too highly during the bonding operation. A further feature of this invention therefore consists in a method of bonding the two metallic bodies which includes the step of pressing the porous metallic body against the denser metal with a cold presser element, thus maintaining a part of the porous metallic body at a lower temperature than said denser metal.

In my copending applications, Serial Nos. 188,929 and 188,930, filed May 5, 1927, I have disclosed the manufacture of machine elements having flat or cylindrical bearing surfaces. According to the applications referred to, these elements were made by first forming a thin sheet of porous metallic material in a manner described hereinafter; and then joining this sheet of porous metallic material to a surface of relatively dense, strong metal by a metallic bond which is substantially co-extensive with the contacting surfaces of the united parts. Where a cylindrical bearing element was formed the porous metallic element was first bent into approximately the desired shape before attaching it to the reinforcing member of denser metal.

The porous metallic element described in the above applications was preferably formed by briquetting a mixture of bronze-metal forming powders, a filler such as graphite and a volatile void forming substance such as salicylic acid, and then heating this briquette at a temperature and for a time sufficient to cause the metal particles to unite and the void forming substance to volatilize so as to produce a metallic structure interspersed with a number of minute intercommunicating voids for receiving lubricant. A method of manufacture of such metal is disclosed in the application of Harry M. Williams, Serial No. 582,550, filed August 17, 1922, now Patent No. 1,642,347, granted Sept. 13, 1927.

In this application I shall disclose in detail an improved method of forming machine elements having either flat or cylindrical bearing surfaces, and a method of manufacture of porous metallic material of novel and improved form.

Further objects and advantages of the present invention will be apparent from the following description, reference being had to the accompanying drawings, wherein a preferred form of embodiment of the present invention is clearly shown.

It has been the practice to employ the porous metallic substance above described as a bearing facing where such facing was attached to a denser metal backing as for instance, in facing a connecting rod bearing. In such a construction, the bearing facing has heretofore been attached to the denser metal backing by means of a metallic bond formed by a metal having a low melting point. The operation of bonding the two metallic elements has previously been carried out by coating a surface of one or the other of said elements with the bonding material, clamping the two elements together and heating the assembly as fully described in my two copending applications above mentioned.

Difficulty has been met heretofore in securing a good bond because of heating during the bonding operation and in the breaking down of the bond when the bearing is in use, at which time the porous metallic substance is also considerably heated. When heated, said porous substance has a tendency to absorb the bonding material. It is one of the purposes of the present invention to overcome this difficulty, and to accomplish this result, I have produced a porous metallic substance of the same general nature as that disclosed in the prior applications referred to, but comprising a plurality of layers or laminations, one of which layers is less porous than the other. In bearings constructed with a facing of this material, having the less porous surface attached to the reinforcing backing of said bearing, the absorption of the bonding material on heating is largely eliminated.

Figure 1:
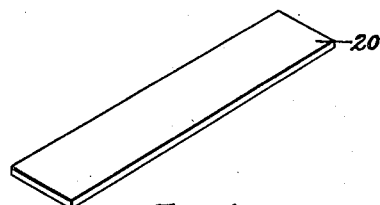
Fig. 1 is a perspective view of a plate comprising porous metallic substance.
Figure 3:
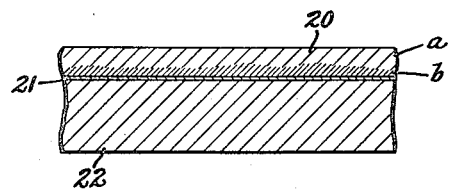
Fig. 3 is a fragmentary sectional view on an enlarged scale taken on the line 3—3 of Fig. 2.

A porous metallic bearing element 20 of this character is shown in perspective in Fig. 1 and in a large cross section in Fig. 3 in which the more porous layer is indicated at *a* and the less porous layer at *b*.

This porous element 20 may be formed by either one of two preferred processes, in one of which processes, the whole mass containing materials for forming both layers of the laminated element is briquetted in a single operation. In the other of these processes a body of porous metal is made in accordance with the process described in application, Serial #582,550 and the less porous layer formed thereon at a subsequent operation.

In the first of these processes the plate 20 is formed by placing a layer of copper, copper-tin or other suitable metallic powder in the bottom of a mold of desired shape, then placing a layer of bronze metal forming powders, graphite and void forming substance or substances such as described in the application referred to, on that already in the mold and briquetting the whole mass, to form a briquette comprising materials for forming a layer of porous metallic substance, and a layer of powdered metals without any void forming substances. This briquette is then sintered to volatilize the void forming substances and form a metallic structure having one layer quite porous, and another layer principally metallic copper or copper alloy which is relatively non-porous.

According to the alternative process above mentioned the mixture of bronze forming metal powders, graphite and void forming substance or substances is briquetted and sintered in accordance with the process described in application, Serial No. 582,550. This briquette is then placed in a mold and a layer of copper, copper-tin or other metal powder is placed thereon and briquetted, forming a mass of sintered and non-sintered material. This briquette is then resintered to provide a coherent body composed of layers of porous and relatively non-porous metallic materials.

The metallic body 20 is used as a bearing facing in either flat or cylindrical bearings. In either form of bearing, said body is joined by a metallic bond to a denser metal reinforcing member, the bond being indicated at 21 in Fig. 3 and the reinforcing member at 22. To join the plate 20 to the reinforcing member 22 the relatively non-porous layer of the plate 20 or the surface of member 22 which is to receive the plate 20 is first coated with a metal capable of alloying or bonding with both the plate 20 and member 22. Where the less porous layer of plate 20 is of bronze and the member 22 is of iron or steel the coating 21 may be of tin. This coating may be applied either by immersion in a tin bath or by applying a sheet of tinfoil to the surface to be coated. The plate 20 and the reinforcing member are then held together with the tin coating between and heated sufficiently to cause the tin to melt and alloy or otherwise unite with the plate 20 and reinforcing member 22. This operation has previously been carried out by clamping one of said elements 20 or 22 against the coated side of the other element with suitable clamps and heating the whole assembly in a bath having a melting temperature above the melting point of tin or other bonding material employed.

This assembly is then cooled and the clamping means removed. The plate 20 is impregnated with lubricant by immersion in hot lubricating oil for a time dependent on the thickness of said plate.

Figure 2:
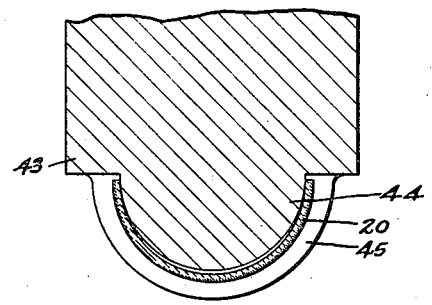
Fig. 2 is a fragmentary end view of two relatively slidable machine parts showing the application of a porous metallic plate to a machine gib.
Figure 2:
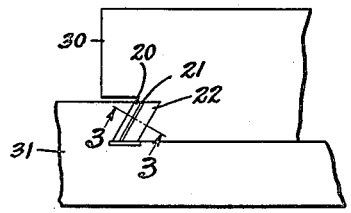

Fig. 2 shows the use of this structure as a gib for relatively slidable machine parts 30 and 31.

I have also discovered that by employing a bonding material consisting of a mixture of metals and heating during the bonding operation to a temperature intermediate the melting points of the metals in said mixture, the objectionable absorption of the bonding metal is prevented. Good results are obtained by using a mixture of zinc and powdered copper, for example. This mixture is placed between the surfaces of porous element 20 and denser metal 22 which are to be joined, the two metal elements are then clamped together and are heated to the melting point of zinc and chilled immediately. When a bonding material of this nature is used the metal having the lower melting point goes into a fluid state and is partially absorbed, alloying with the two elements 20 and 22. The metal of higher melting point is, however, in the form of grains or crystals which are not absorbed. Such a bonding material may be used to attach a metallic element of porous form throughout or a laminated element such as disclosed herein to the element 22.

Figure 4:
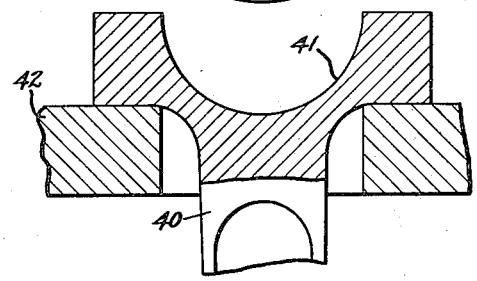
Fig. 4 is a view, partly in section, of apparatus used in attaching a porous bearing facing to a reinforcing member, for example, the connecting rod.

As above stated difficulty has been met in carrying out the bonding operation in the manner above described because of a tendency of the porous metallic body to absorb the bonding material when the assembly is heated sufficiently to melt said bonding material. It has been found that this difficulty may be overcome by heating the porous metal while the surfaces to be joined are held in contact and after one of said surfaces is coated with the bonding material, the heating being effected in such a way that the porous metal is not sufficiently heated throughout to absorb the bonding material. This feature of the invention is illustrated herein in the formation of a connecting rod bearing, reference being had to Fig. 4 of the drawings. It is obvious, however, that such a method could be carried out in the manufacture of any form of bearing, either flat or cylindrical, or in fact, in the joining of the porous metallic element 20 to any form of reinforcing member whatever.

In bonding the porous metallic element 20 to a connecting rod 40, according to the method referred to, the element 20 is first bent to approximately the shape of the connecting rod surface to which it is to be joined. This process of shaping is no part of the present invention and is not disclosed herein but is fully described in my copending application Serial #188,930. After the element 20 is shaped, a surface of the said element or the surface 41 of the connecting rod to which the element is to be attached is coated with the bonding metal as previously described. The connecting rod is then heated to about 500° F. and is supported while at such temperature on the supporting block 42 of a press, directly beneath press plunger 43. The lower end 44 of the press plunger corresponds in shape to and is slightly smaller than the surface 41. The element 20 is then placed on the end 44 of the press plunger, being held thereon by the spring tendency of the element itself to clamp the support, and is centered between two flanges 45 projecting from the press plunger, the distance between such flanges being equal to the length of the connecting rod bearing. The press plunger is then depressed to bring the coated surface of one of said elements 20 or 41 into contact with a surface of the other element, the heat of the connecting rod serving to melt bonding material and securely attach the element 20 to said rod.

During this operation, the press plunger 43 is maintained relatively cold in any suitable manner and the heat of the connecting rod is so rapidly dissipated through absorption by the press plunger that the temperature of element 20 is not raised sufficiently to cause absorption of the bonding metal to any material extent.

While this method of carrying out the bonding operation is particularly effective where the element 20 is of porous structure throughout it is obvious that the method could be employed in bonding the laminated element 20 herein disclosed to a reinforcing member of denser metal with just as good results.

While the operation of coating one of the surfaces to be joined with the bonding metal may be effected by placing a thin layer such as tinfoil on one of said surfaces, the connecting rod or other reinforcing member may be heated in a tin bath which will effect the heating of said member and the coating of the surface to be attached to the porous element in a single operation.

The method of attaching the porous facing to the cap of the connecting rod is just the same as that above described with one exception. The cap must be heated to a higher temperature than the rod, for example, to 550° F., because the cap is of less mass than the rod and loses heat during the operation more rapidly than the rod.

Obviously the operation described above of making a connecting rod bearing may be employed in making any bearing having a flat bearing surface, the reinforcing member being heated to a desired degree as determined by its mass, the bonding coating being applied to one of the surfaces to be joined and two elements being then pressed together while the reinforcing member is still hot.

Figure 5:
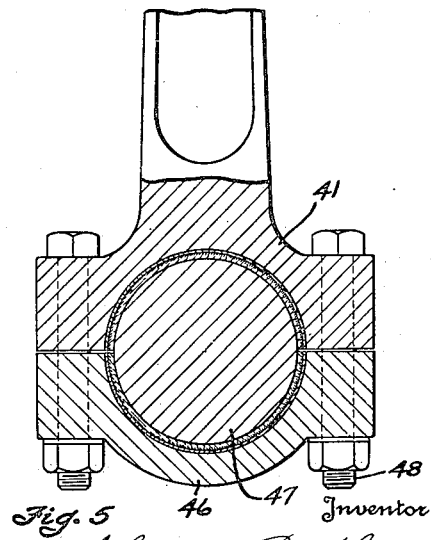
Fig. 5 is a fragmentary view, partly in section, of a connecting rod provided with a bearing according to this invention.

Fig. 5 shows a completed and assembled connecting rod bearings. The rod 41 and cap 46, having been faced with a porous bearing surface in the manner above set forth, are secured in position surrounding the shaft 47 by means of bolts 48.

While the form of embodiment of the present invention as herein disclosed, constitutes a preferred form, it is to be understood that other forms might be adopted, all coming within the scope of the claims which follow.

What is claimed is as follows:

1. A machine element comprising a metallic body formed of a plurality of layers having different degrees of porosity and a reinforcing member of denser metal secured thereto.

2. A machine element comprising a metallic body formed of a plurality of layers having different degrees of porosity and a reinforcing member of denser metal secured to the less porous layer.

3. A machine element comprising a metallic body formed of a plurality of layers of different degrees of porosity and a body of ferrous metal attached to the less porous layer by an alloy bond.

4. A bearing element comprising a thin metallic facing and a reinforcing member secured thereto, said facing being formed of a plurality of layers, the layers differing in degree of porosity.

5. A bearing element comprising a thin metallic facing and a reinforcing member secured thereto, said facing being formed of a plurality of layers, the layers differing in degree of porosity, and the less porous layer of said facing being secured to the reinforcing member.

6. A machine element comprising a porous metallic facing and a metal backing therefor secured together by an alloy bond, said alloy consisting of a mixture of metals having different melting points.

7. A machine element comprising a porous metallic facing and a metal backing therefor secured together by an alloy bond, said alloy consisting of a mixture of zinc and copper.

8. A machine element comprising a porous metallic facing and a metal backing therefor secured together by an alloy bond, said alloy consisting of a matrix of alloyed zinc and grains of copper.

9. A machine element comprising a body of porous bronze secured to a body of ferrous metal by an alloy bond, said alloy consisting of a mixture of zinc and copper.

In testimony whereof I hereto affix my signature.

CHARLES R. SHORT.